(12) United States Patent
Erhart et al.

(10) Patent No.: US 9,360,868 B2
(45) Date of Patent: Jun. 7, 2016

(54) GROUND VEHICLE-LIKE CONTROL FOR REMOTE CONTROL AIRCRAFT

(71) Applicant: TRAXXAS LP, McKinney, TX (US)

(72) Inventors: Wesley Ronald Erhart, McKinney, TX (US); Scott Rollin Michael Schmitz, Lewisville, TX (US); Tom Kawamura, Plano, TX (US); Richard Douglas Hohnholt, Coppell, TX (US); Kent Poteet, Lucas, TX (US)

(73) Assignee: TRAXXAS LP, McKinney, TX (US)

( * ) Notice: Subject to any disclaimer, the term of this patent is extended or adjusted under 35 U.S.C. 154(b) by 0 days.

(21) Appl. No.: 14/526,385

(22) Filed: Oct. 28, 2014

(65) Prior Publication Data

US 2015/0202540 A1    Jul. 23, 2015

Related U.S. Application Data

(60) Provisional application No. 61/896,552, filed on Oct. 28, 2013.

(51) Int. Cl.

| | |
|---|---|
| *G05D 1/08* | (2006.01) |
| *A63H 17/38* | (2006.01) |
| *A63H 17/36* | (2006.01) |
| *A63H 30/00* | (2006.01) |
| *A63H 30/04* | (2006.01) |
| *G05D 1/00* | (2006.01) |
| *G08C 17/02* | (2006.01) |

(52) U.S. Cl.
CPC .............. *G05D 1/0808* (2013.01); *A63H 17/36* (2013.01); *A63H 17/38* (2013.01); *A63H 30/00* (2013.01); *A63H 30/04* (2013.01); *G05D 1/0016* (2013.01); *G05D 1/0033* (2013.01); *G08C 17/02* (2013.01); *G08C 2201/30* (2013.01)

(58) Field of Classification Search
CPC ....... A63H 17/36; A63H 17/38; A63H 30/00; A63H 30/04; G05D 1/00; G05D 1/0011; G05D 1/0016; G05D 1/0033; G05D 1/02; G05D 1/0202; G05D 1/08; G05D 1/0808
See application file for complete search history.

(56) References Cited

U.S. PATENT DOCUMENTS

| | | | | |
|---|---|---|---|---|
| 4,964,598 A | * | 10/1990 | Berejik ................. | A63H 30/04 244/179 |
| 5,238,203 A | * | 8/1993 | Skonieczny ......... | G05D 1/0858 244/17.13 |
| 5,707,237 A | | 1/1998 | Takemoto | |
| 5,865,624 A | | 2/1999 | Hayashigawa | |

(Continued)

FOREIGN PATENT DOCUMENTS

| | | |
|---|---|---|
| JP | H10-257575 A | 9/1998 |
| JP | 2000-126466 A | 5/2000 |

(Continued)

OTHER PUBLICATIONS

3D Robotics, "PPM Encoder," PPM Encoder User Manual V2, 3D Robotics, Inc., Jan. 13, 2014, 3 pages.

(Continued)

*Primary Examiner* — Andrew Bee
(74) *Attorney, Agent, or Firm* — CARR Law Firm PLLC (57) ABSTRACT

A hand-held radio transmit controller for remotely controlling an aircraft, and a method for controlling a remote control aircraft offering ground vehicle-like control.

12 Claims, 8 Drawing Sheets

(56) References Cited

U.S. PATENT DOCUMENTS

| | | | |
|---|---|---|---|
| 6,227,482 B1 | 5/2001 | Yamamoto | |
| 7,220,160 B2 * | 5/2007 | Kiuchi | A63H 30/04 341/176 |
| 7,610,131 B2 | 10/2009 | Kojima | |
| 7,885,732 B2 | 2/2011 | Troy | |
| 7,931,239 B2 | 4/2011 | Pedersen et al. | |
| 8,049,600 B2 | 11/2011 | Beard | |
| 8,154,227 B1 | 4/2012 | Young | |
| 8,160,816 B2 | 4/2012 | Kanai | |
| 8,200,375 B2 | 6/2012 | Stuckman et al. | |
| 8,330,583 B2 | 12/2012 | Beard et al. | |
| 8,473,117 B1 | 6/2013 | McConville | |
| 8,545,284 B2 | 10/2013 | Baarman et al. | |
| 8,818,571 B1 | 8/2014 | Iida et al. | |
| 9,004,973 B2 | 4/2015 | Condon et al. | |
| 9,020,644 B2 | 4/2015 | Greeley et al. | |
| 9,043,029 B2 | 5/2015 | Seo | |
| 2002/0022909 A1 | 2/2002 | Karem | |
| 2002/0142701 A1 | 10/2002 | Rosenberg | |
| 2004/0077284 A1 | 4/2004 | Bonilla et al. | |
| 2005/0222729 A1 | 10/2005 | Sakata | |
| 2006/0052917 A1 | 3/2006 | Schwarzhaupt | |
| 2006/0071551 A1 | 4/2006 | Taniguchi et al. | |
| 2006/0085111 A1 | 4/2006 | Kojima | |
| 2006/0164383 A1 | 7/2006 | Machin et al. | |
| 2006/0229034 A1 | 10/2006 | Gizis et al. | |
| 2007/0018041 A1 * | 1/2007 | Butler | A63H 23/04 244/105 |
| 2007/0035412 A1 | 2/2007 | Dvorak | |
| 2008/0026671 A1 | 1/2008 | Smith et al. | |
| 2009/0076664 A1 | 3/2009 | McCabe | |
| 2009/0099735 A1 | 4/2009 | McCoy | |
| 2009/0222168 A1 | 9/2009 | Egenfeldt | |
| 2011/0049290 A1 | 3/2011 | Seydoux et al. | |
| 2011/0054717 A1 | 3/2011 | Yamauchi | |
| 2011/0231050 A1 | 9/2011 | Goulding | |
| 2011/0275274 A1 | 11/2011 | Dewitt et al. | |
| 2012/0015686 A1 * | 1/2012 | Krupnik | H04W 88/02 455/550.1 |
| 2012/0027049 A1 | 2/2012 | Beard et al. | |
| 2012/0041658 A1 | 2/2012 | Turner | |
| 2012/0046856 A1 | 2/2012 | Doi | |
| 2012/0130593 A1 | 5/2012 | Davis | |
| 2012/0179322 A1 | 7/2012 | Hennessy | |
| 2012/0232718 A1 * | 9/2012 | Rischmuller | A63H 27/12 701/2 |
| 2012/0259479 A1 | 10/2012 | Yoneta | |
| 2012/0298789 A1 * | 11/2012 | Oz | B64C 29/0033 244/12.4 |
| 2013/0226408 A1 | 8/2013 | Fung | |
| 2013/0226409 A1 | 8/2013 | Akiyama et al. | |
| 2013/0231814 A1 | 9/2013 | Sarokhan | |
| 2014/0143839 A1 | 5/2014 | Ricci | |
| 2014/0277836 A1 | 9/2014 | Iida et al. | |
| 2014/0323013 A1 | 10/2014 | Gonzalez-Heydrich | |
| 2015/0039350 A1 | 2/2015 | Martin | |
| 2015/0094880 A1 | 4/2015 | Beard et al. | |
| 2015/0103019 A1 | 4/2015 | Young | |

FOREIGN PATENT DOCUMENTS

| | | | |
|---|---|---|---|
| JP | 2000-209684 A | 7/2000 | |
| JP | 2001-352414 A | 12/2001 | |
| JP | 2002-263368 A | 9/2002 | |
| JP | 2003-38863 A | 2/2003 | |
| JP | 2007-79797 A | 3/2007 | |
| JP | 2010-029724 A | 2/2010 | |

OTHER PUBLICATIONS

ArduCopter Multirotor UAV, "APM:Copter," Table of Contents, 3D Robotics, www.copter.ardupilot.com, Oct. 28, 2014, 2 pages.
Oes, J "Manual for 8 Channel PPM Encoder (v2) Firmware: v2.3.16," 3DR, Mar. 1, 2013, 4 pages.
Firebird Stratos, "Instruction Manual," RTF Ready-To-Fly, Hobbyzone, HBZ7700, www.hobbyzonerc.com, 2012, 24 pages.
Futaba,:Digital Proportional Radio Control "PCM Single Stick Pulse Code Modulation System," Instruction Manual FP-8SSAP, PCM 8 Channels for F3A Aircraft, 44 pages.
Eagle Tree Systems LLC., "Guardian 2D/3D Stabilizer," Document Version 2.3, PC Software 10.63 or Later, 2013-2014, 14 pages.
Eagle Tree Systems LLC., "Instruction Manual for Guardian TM Stabilzation Expander, Document Version 1.9, Corresponds to Eagle Tree Software Versionn 10.01 or Higher", www.eagletreesystems.com, 2011, 7 pages.
PCT/US2014/062734; International Search Report and Written Opinion; Feb. 10, 2015.
Firebird Stratos, "Instruction Manual," RTF Ready-To-Fly, Hobbyzone, HBZ7700, www.hobbyzonerc.com, Dec. 14, 2012, 24 pages.
U.S. Appl. No. 14/461,228; Declaration of Property Rights, Oct. 16, 2014.
Scott, Dave; "Building Good Habits for a Better Future" Aileron-Rudder Mixing Explained; Oct. 20, 2014. http://www.rcflightschool.com/aileron-ruddermixing.pdf.
Futaba; "Futaba 8J Manual"; Oct. 24, 2014.
Futaba FP-8SSAP Instruction Manual; Jan. 1, 2007 http://web.archive.org/web/20070101235151/http://manuals.hobbico.com/fut/8ssap-manual.pdf.
Eagle Tree Guardian 2D/3D Stabilizer instructions Doc. Ver. 1.7; Feb. 28, 2013.
Short, Jason; APM Copter Drift Mode; Nov. 11, 2013 http://www.youtube.com/watch?v=0mdk2-sNXmg.
APM Copter; ArduCopter; Drift Mode; Oct. 27, 2014 http://copter.ardupilot.com/wiki/drift-mode/.
Happy Cow; 3-channel Move Motion helicopter; Pistol Transmitter, photographs of Pistol Transmitter product; Apr. 16, 2012.
HITEC; Neon SS Manual; Jan. 26, 2011 http://web.archive.org/web/20110126193403/http://hitecrcd.com/files/NeonSSFMManual.pdf.
Happy Cow; Pistol Transmitter "Move Motion Manual"; Apr. 16, 2012.

* cited by examiner

Virtual Instructor™ Technology

The Virtual Instructor™ technology features 4 assisting systems:

Wing Leveling—Uses a stabilization sensor to keep the wings level during normal flight.
*What you will see...after the throttle is increased above 50%, the propellers will turn when rudder is applied or the aircraft is moved.*

Rudder to Elevator Mixing—Assists with stability during turns.
*What you will see...the elevator moves when the rudder is moved.*

Throttle to Elevator Mixing—Aids in control during descending and landing.
*What you will see...the elevator moves when the throttle stick is moved below 50%.*

Rudder to motor (differential thrust) mix—Supports wing leveling to make more powerful corrections.
*What you will see...after the throttle is increased above 50%, the propellers will turn when rudder is applied or the aircraft is moved.*

These automatic systems work together to help prevent the kind of situations experienced by new pilots, such as over-correction, that can lead to accidents.

FIG. 16
*PRIOR ART*

GROUND VEHICLE-LIKE CONTROL FOR REMOTE CONTROL AIRCRAFT

CROSS-REFERENCE TO RELATED APPLICATIONS

This application relates to, and claims the benefit of the filing date of, U.S. provisional patent application Ser. No. 61/896,552 entitled GROUND VEHICLE-LIKE CONTROL FOR REMOTE CONTROL AIRCRAFT, filed Oct. 28, 2013, the entire contents of which are incorporated herein by reference for all purposes.

TECHNICAL FIELD

This application relates to remote control aircraft and, more particularly, to piloting of remote control aircraft.

BACKGROUND

Remote control (RC) ground vehicles are typically controlled with a transmit controller which has two components: a steering knob, also called a steering wheel, and a throttle/brake control. A human driver familiar with this control interface is able to adeptly drive a ground vehicle regardless of the vehicle's orientation with respect to the driver. Thus, the driver may be capable of driving the vehicle whether it is facing toward the driver or away from the driver. The driver may also easily execute high speed turns with a RC ground vehicle.

The same driver, however, may encounter difficulty when piloting an RC air vehicle. Piloting a conventional RC air vehicle requires significantly more skill than driving a RC ground vehicle. The conventional two-stick aircraft controller requires a pilot to control the aircraft's throttle and yaw and pitch and roll independently. The pilot must be aware of the orientation of the aircraft when applying the controls, which requires significantly more awareness than being aware of the orientation of a ground vehicle. Making a "coordinated turn" with an RC aircraft requires the pilot to simultaneously input yaw, pitch, and roll commands in order to command the aircraft to turn in the air without "skidding" (sliding to the outside) or "slipping" (dropping towards the inside) in the turn. At the same time the pilot must also make adjustments to the throttle command to control or maintain the aircraft's altitude.

It would be desirable if a pilot of an RC air vehicle could take greater advantage of the pilot's familiarity with the controls of an RC ground vehicle.

Figure 14:
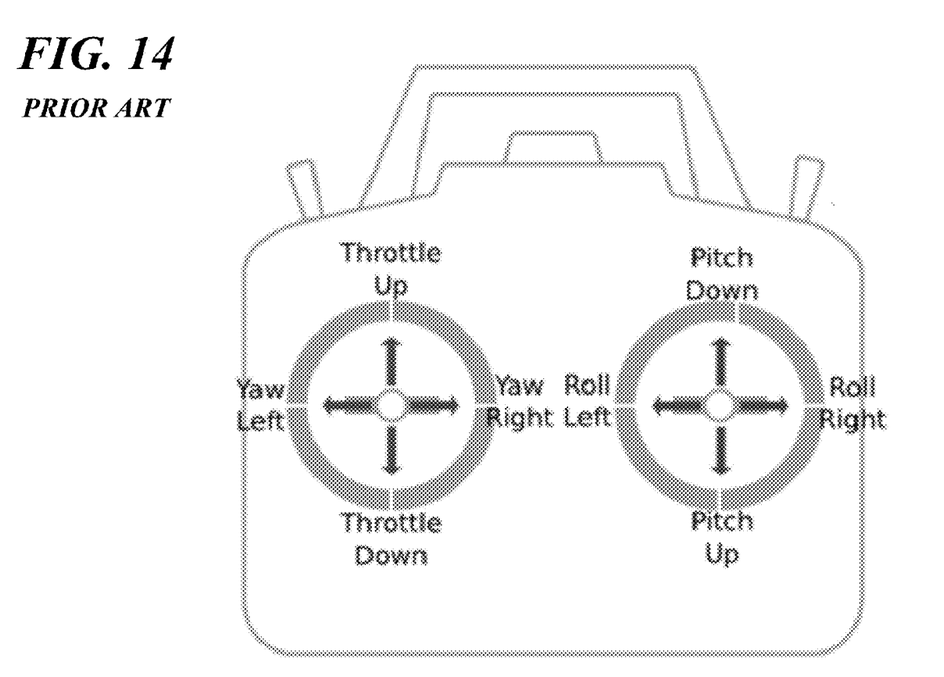
FIG. 14 illustrates a conventional, "two stick" transmit controller for RC aircraft.

Conventional RC aircraft are controlled with a "two stick" transmit controller as previously described. A typical Mode 2 transmitter will be configured as shown in FIG. 14. Moving the left stick fore and aft controls throttle; moving it left and right controls yaw. Moving the right stick fore and aft controls pitch; moving it left and right controls roll. In the example of a fixed-wing aircraft, moving the left stick fore and aft will increase or decrease the thrust from the power source (electric motor or combustion engine). Move the left stick left and right will move the rudder control surface to yaw the airplane to the left or right. Moving the right stick fore and aft will move the elevator control surface(s) to pitch the airplane up and down. Moving the right stick left and right will move the aileron control surfaces to roll the airplane to the left or right.

Conventional two-stick transmitters may be configured with a "mix" between one or more controls. For example, a transmitter could be configured so the rudder moves when the ailerons are commanded to move. In this example, when moving only the right stick left and right, a percentage of rudder movement can be commanded. This may result in a so-called coordinated turn in which the airplane will both bank and yaw at the same time. Coordinated turns in fixed-wing aircraft may be useful to counteract the effects of adverse yaw, for example. In the example of a multi-rotor aircraft such as a quadcopter, coordinating bank angle and yaw together may be extremely useful in executing natural looking turns without "skidding" or "slipping".

One conventional two-stick transmitter that can be configured with a "mix" is the Futaba 8J. Both linear and non-linear (5 point) mixes can be configured. Pages 65-69 of the product manual contain detailed description of the mixes available. The entirety of the Futaba 8J product manual is hereby incorporated by reference. The four linear programmable mixes available on the Futaba 8J are setup by default as: 1) aileron to rudder for coordinated turns, 2) elevator to flap for tighter loops, 3) flap to elevator to compensate pitching with flaps and 4) throttle to rudder for ground handling compensation.

Figure 15:
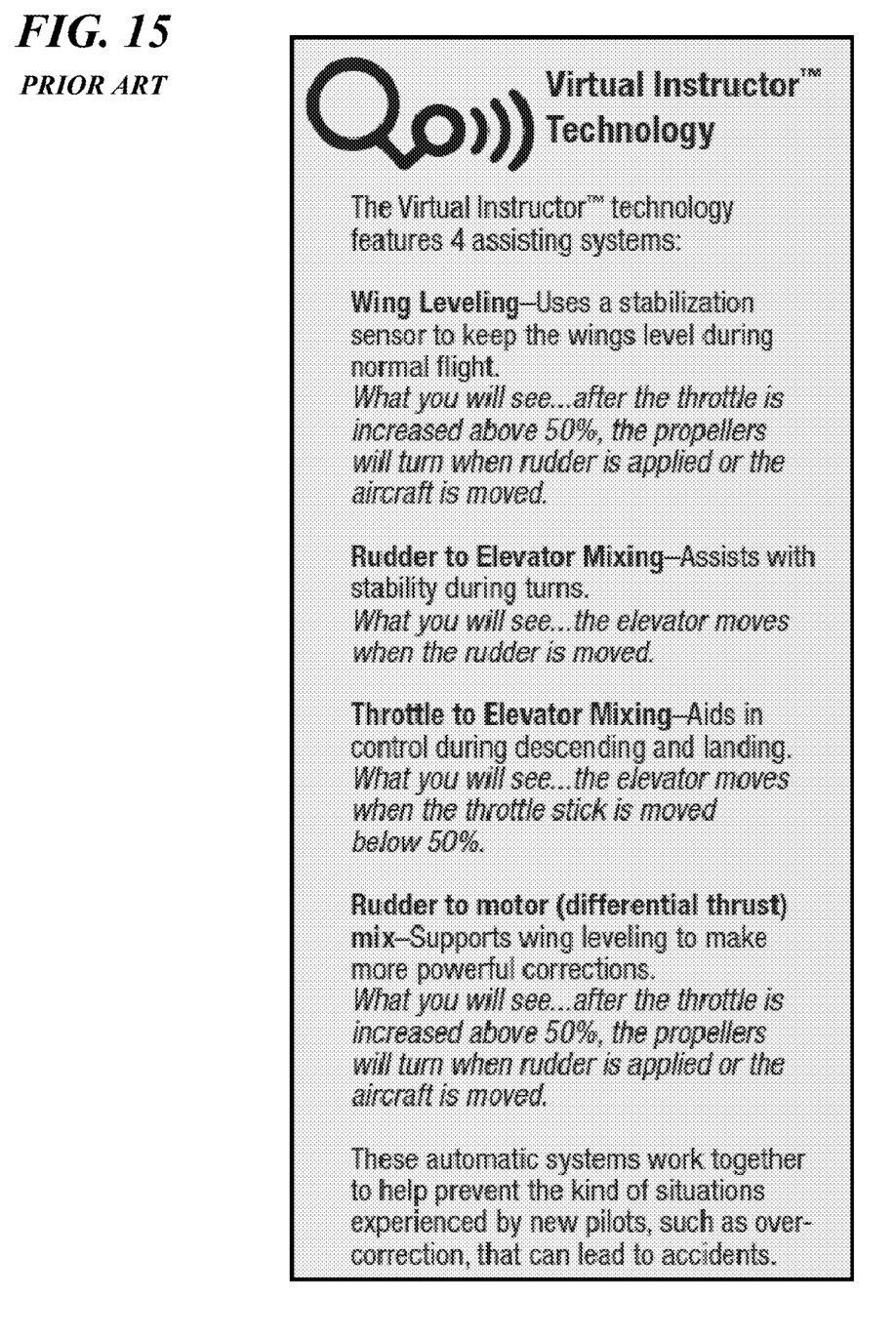
FIG. 15 illustrates an example of pre-configured mixes which may be available on some ready-to-fly (RTF) aircraft which use simple transmitters.

Pre-configured mixes may be available on some ready-to-fly (RTF) aircraft which use simple transmitters that are not programmable by the end user. One example is the Hobbyzone Firebird Stratos, by Horizon Hobby. Using its Virtual Instructor Technology, as shown in FIG. 15, this aircraft uses at least three different mixes: 1) rudder to elevator mixing, 2) throttle to elevator mixing and 3) rudder to motor mixing. See page 6 of the Firebird Stratos Instruction Manual for more details. The entirety of the Firebird Stratos Instruction Manual is hereby incorporated by reference.

Figure 16:
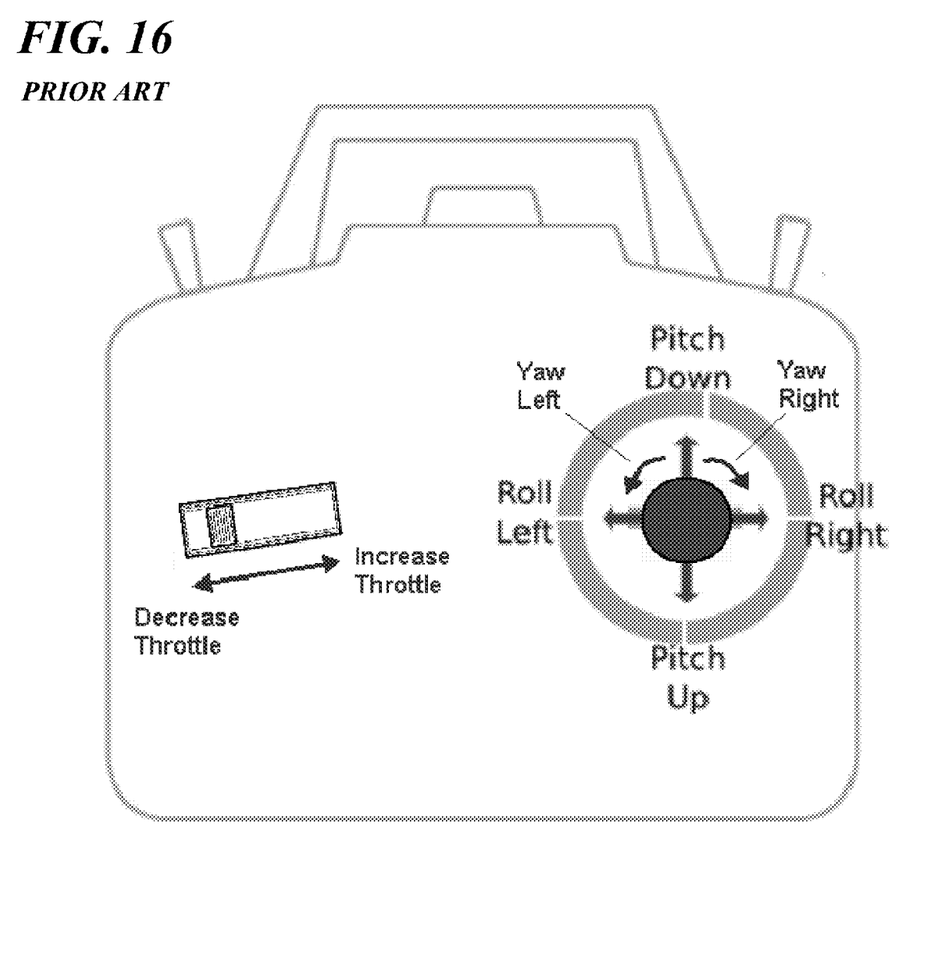
FIG. 16 illustrates a "single stick" transmitter popular in prior decades.

Non-conventional "single stick" transmitters were popular for some time in 1970's and the 1980's. These transmitters relocated control of the rudder to the right stick, by using a knob at the tip of the stick, as seen in FIG. 16. Rotating the knob to the right (clockwise) would result in the same control as pushing the conventional rudder stick of FIG. 14 to the right. Rotating the knob to the left (counter-clockwise) would result in the same control as pushing the conventional rudder stick of FIG. 14 to the left. The throttle was controlled by a slider, typically actuated by the pilot's left thumb. The Futaba FP-T8SSA-P transmitter is one example of a "single stick" transmitter. Mixing was available on this Futaba single-stick radio, the details of which can be found at least on pages 5, 29, 30, 32, 33 and 34 of the Futaba FP-T8SSA-P Instruction Manual. A quote from page 33, titled AILERON→RUDDER MIXING, "This function is sometimes referred to as 'CAR' (Coupled Ailerons and Rudder) and is useful on sailplanes and certain scale models where aileron and rudder must be used together for coordinated turns." The entirety of the Futaba FP-T8SSA-P Instruction Manual is hereby incorporated by reference.

The entirety of each of the following U.S. patents is hereby incorporated by reference: U.S. Pat. No. 8,473,117 to McConville; U.S. Pat. No. 6,227,482 to Yamamoto; and U.S. Pat. No. 8,200,375 to Stuckman et al. The subject matter disclosed in each of the aforementioned patents may be utilized or adapted to control single-rotor, multiple-rotor and/or fixed-wing aircraft as discussed herein.

Aftermarket aircraft control systems are available that utilize more advanced electronics and control systems to improve control of the aircraft and sometimes to automate certain functions. One example is the Guardian by Eagle Tree Systems. The Guardian is specifically made for fixed-wing aircraft and uses both accelerometers and gyroscopes. In its 2D Mode it provides wing leveling stabilization, returning the model to level flight when needed. In 3D mode it works to smooth out turbulence and stall characteristics. The Guardian also includes Automatic Turn Coordination which employs the "step on the ball" method to actuate the rudder in order to coordinate turns. As the aircraft enters a banked turn the Guardian will actuate the rudder and "step on the ball" to perform automatic turn coordination. There are many other features available on the Guardian as shown in the product literature and Guardian Instruction Manual. The Guardian 2D/3D Stabilizer Manual and the Instruction Manual for Guardian Stabilization Expander by Eagle Tree Systems are hereby incorporated by reference.

APM, a popular open-source autopilot suite, released version 3.1 of their APM:Copter in December of 2013. In this version they included a new flight mode called "Drift Mode", which allows the pilot to fly a multirotor helicopter as if it were a plane with built in automatic coordinated turns. The pilot has direct control of yaw and pitch, but roll is controlled by the autopilot. The right stick controls pitch and yaw and the left stick is for manual altitude control via the throttle. When the aircraft is moving forward and the pilot pushes the right stick to the left or right to make a turn, the aircraft will also bank at the same time, to make a coordinated turn in that direction. Drift mode relies on GPS to function. Yaw and roll are mixed based on velocity. More information can be obtained by visiting the APM website, http://copter.ardupilot.com/. The APM:Copter documentation available in the ArduCopter|Multirotor UAV web pages at http://copter.ardupilot.com/, including but not limited to the "Manual for 8 Channel PPM Encoder (v2), Firmware: v2.3.16" and "PPM Encoder" instruction manual by 3DRobotics, are hereby incorporated by reference.

SUMMARY

A hand-held radio transmit controller for remotely controlling an aircraft may be used in conjunction with a method for controlling a remote control aircraft offering ground vehicle-like control.

DESCRIPTION OF DRAWINGS

Reference is now made to the following Detailed Description taken in conjunction with the accompanying drawings, in which.

DETAILED DESCRIPTION

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

Figure 1A:
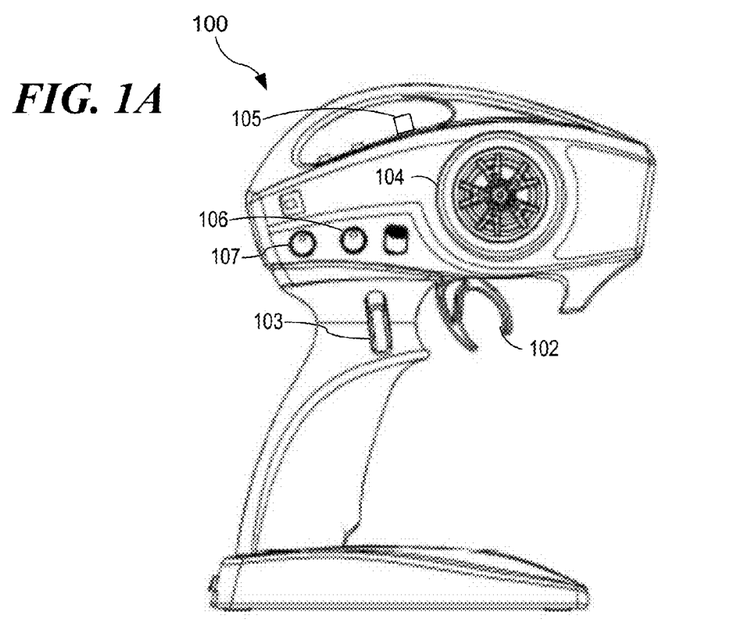
FIG. 1A-1C shows a traditional RC ground controller.
Figure 1B:
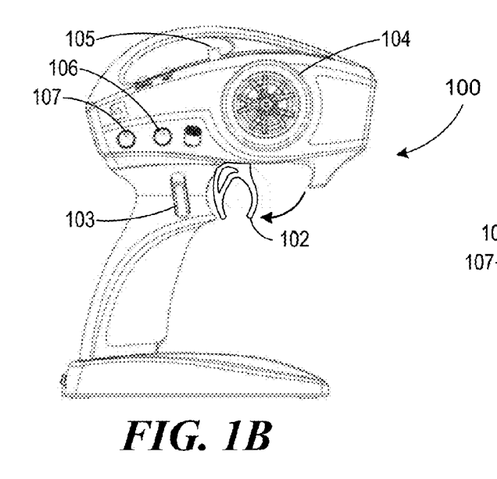
Figure 1C:
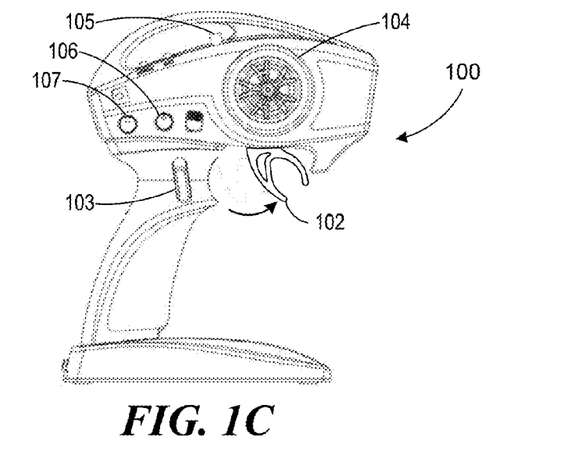

Referring to FIG. 1A-1C, depicted is a typical ground R/C vehicle transmit controller 100. Transmit controller 100 has a human machine interface (HMI) comprising such features as throttle trigger 102, steering knob 104, and other controls or indicators as required. In an embodiment, the "trigger" may be a lever having a shape, such as the trigger shape shown herein, the lever mounted for pivotable movement in at least two directions. The lever, trigger 102, may have a neutral position in the approximate center of its range of travel, and may provide a continuous range of input into the control system when moved. In an embodiment, when the lever is moved in a first direction towards the user, a forward direction of vehicle travel may be indicated by the command input, and when the lever is moved in a second direction away from the user, braking or a reverse direction of ground vehicle travel may be indicated by the command input. The lever in intermediate positions between the neutral position and the two extremes of travel may provide a continuous range of input which, in an embodiment, may be interpreted as desired vehicle speed in the chosen direction, or the amount of braking to be applied.

In an embodiment, the transmit controller 100 may also have a "thumb switch" 103, a "channel four" switch 105, and two auxiliary adjustment knobs 106 and 107. When the vehicle is not being driven, throttle trigger 102 may be at a neutral position, as shown in FIG. 1A. A driver may pull throttle trigger 102 from the neutral position toward the driver to command forward throttle, as shown in FIG. 1B. The driver may push throttle trigger 102 from the neutral position away from the driver to command reverse throttle or braking, as shown in FIG. 1C. The distance the driver pushes or pulls throttle trigger 102 from the neutral position may determine the amount of throttle or braking applied.

Figure 2:
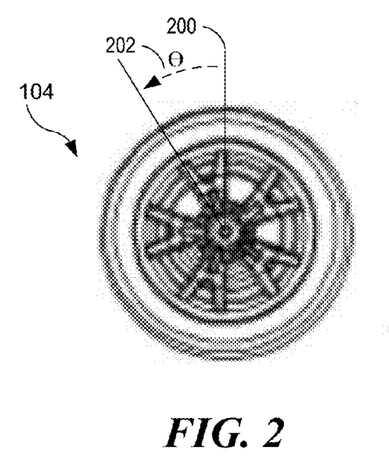
FIG. 2 shows the operation of the steering knob of a traditional RC ground controller.
Figure 3:
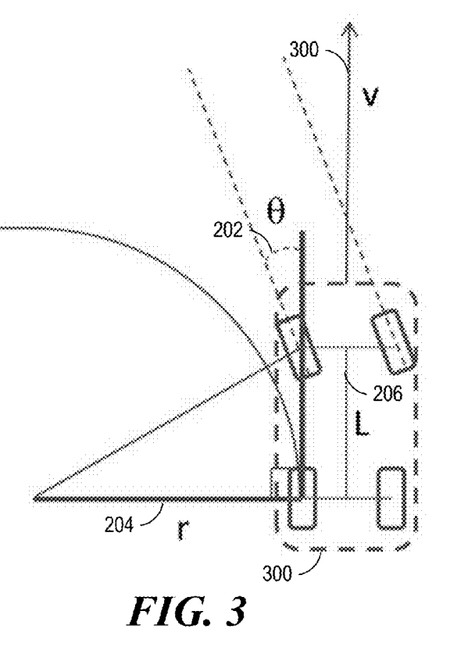
FIG. 3 shows the relationship between steering angle and turn radius.

Referring to FIG. 2, depicted is the operation of steering knob 104. The driver may turn steering knob 104 from neutral position 200 to command the vehicle to use steering angle 202. Referring to FIG. 3, depicted is the effect of steering angle 202 on the vehicle 300, which is moving with velocity 300. As is known in automobile physics, steering angle 202 affects vehicle turn radius 204. Vehicle wheelbase 206 also affects vehicle turn radius 204. Larger steering angles result in smaller vehicle turn radii.

Figure 4:
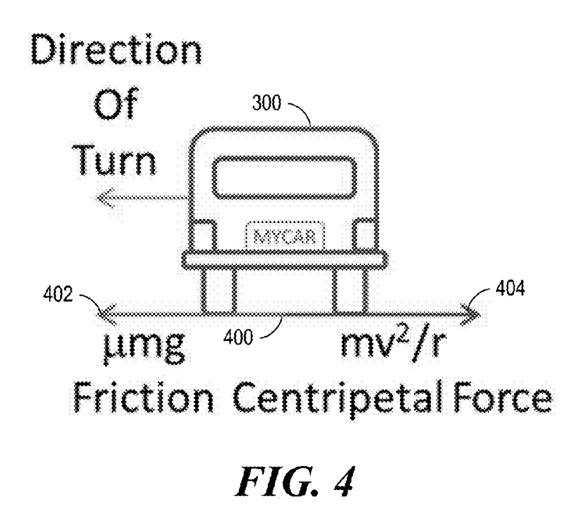
FIG. 4 shows forces acting on a ground vehicle during a turn.

Referring to FIG. 4, depicted is a rear view of ground vehicle 300 during a turn on surface 400. During the turn, friction 402 between vehicle 300 and surface 400 prevent vehicle 300 from skidding. If vehicle 300 is turned at too small a turn radius for its speed, centripetal force 404 exceeds friction 402 and causes vehicle 300 to skid sideways in the turn.

An air vehicle may be piloted with a control model similar to the control model of a ground vehicle. This ground vehicle-like control model may be applied to all varieties of air-based vehicles: quadrotor, coaxial, fixed-wing, other helicopters, etc. The pilot's transmit controller may have a throttle trigger and steering knob, which function similarly to conventional ground vehicle transmit controllers.

With the throttle trigger and steering knob, the pilot may control the air vehicle in two dimensions as the pilot would a ground vehicle. With the throttle trigger, the pilot may have control over forward and reverse movement. Forward movement by forward pitch of a rotary-winged aircraft and/or by increased throttle of a fixed-wing aircraft. Reverse movement by rearward pitch of a rotary-winged aircraft and/or decreased throttle in a fixed-winged aircraft. With the steering knob, the pilot may have control over steering. In one embodiment of the transmit controller, the throttle trigger may be controlled by the pilot's index finger or middle finger. In this same embodiment the steering knob may be gripped by the opposite hand, using two or more fingers.

Figure 8:
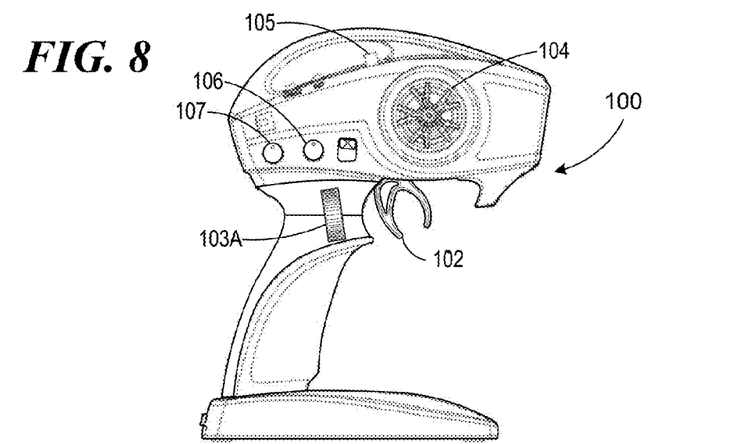
FIGS. 8-10, 11-12, and 13 show alternate RC ground controllers.
Figure 9:
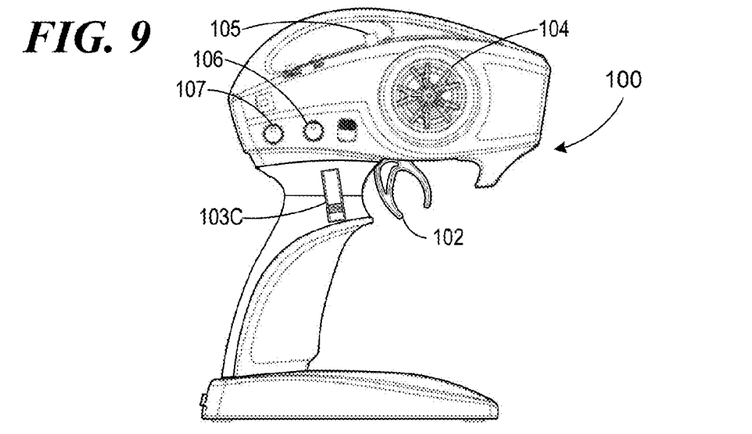
Figure 10:
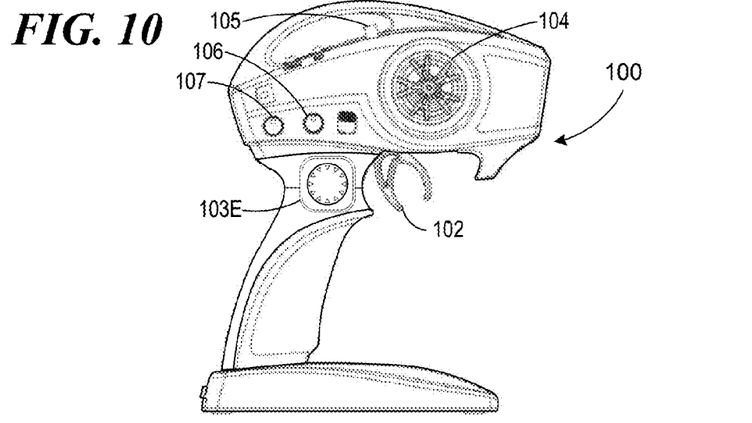
Figure 11:
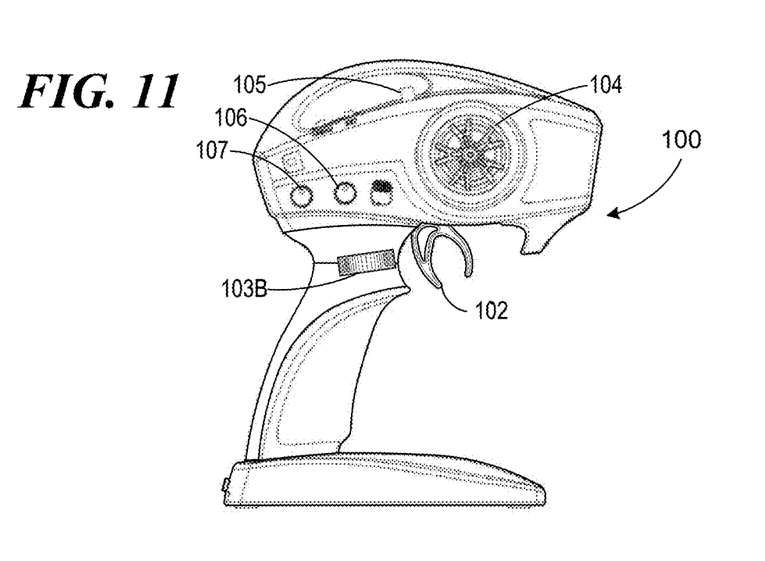
Figure 12:
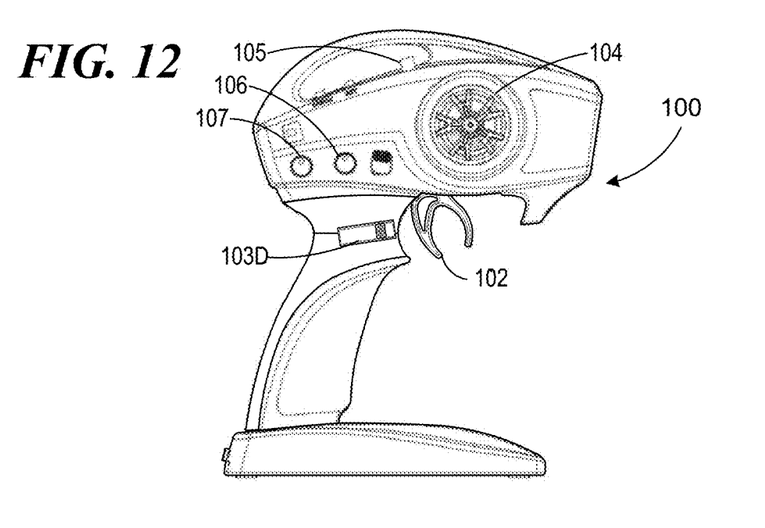

For control in three dimensions, the pilot's transmit controller may feature an altitude control in addition to the throttle trigger and steering knob. Different options are possible for the altitude control. A drive altitude knob may allow the pilot to specify a desired "drive altitude" for the air vehicle to maintain. An altitude gimbal, slider or thumb-wheel may allow the pilot to specify a rate of climb or dive. Referring to FIG. 1A, one embodiment of the pilot's aircraft transmit controller may have said drive altitude knob, gimbal, slider or thumb wheel located at 103, as shown in FIGS. 8-13, and operable by the pilot's thumb. As shown in FIG. 8, a thumb-wheel 103A may be oriented to be turned up and down by the pilot's thumb. Alternatively, as shown in FIG. 11, a thumb-wheel 103B may be oriented to be turned forward and backward by the pilot's thumb. As shown in FIG. 9, a slider 103B may be oriented to be slid up and down by the pilot's thumb. Alternatively, as shown in FIG. 12, a slider 103D may be oriented to be slid forward and backward by the pilot's thumb. As shown in FIG. 10, a gimbal 103E may be oriented to be moved up, down, forward and backward by the pilot's thumb.

Other locations for the altitude control may be used as well. For example, knob 106 or 107 may be used as the altitude control input. Other digits of the pilot's hand may be used to control the gimbal, slider or thumb-wheel, such as the index finger, middle finger, ring finger or pinky (baby) finger. For more natural altitude control, the transmit controller may have altitude tilt sensors. The tilt sensors may allow the pilot to indicate, or command, a climb or dive by tilting the transmit controller. The tilt sensors may determine the amount of tilt and the corresponding climb or dive rates. Regardless of the type of the altitude control, the transmit controller may transmit the drive altitude or desired climb or dive rates to the air vehicle.

Figure 13:
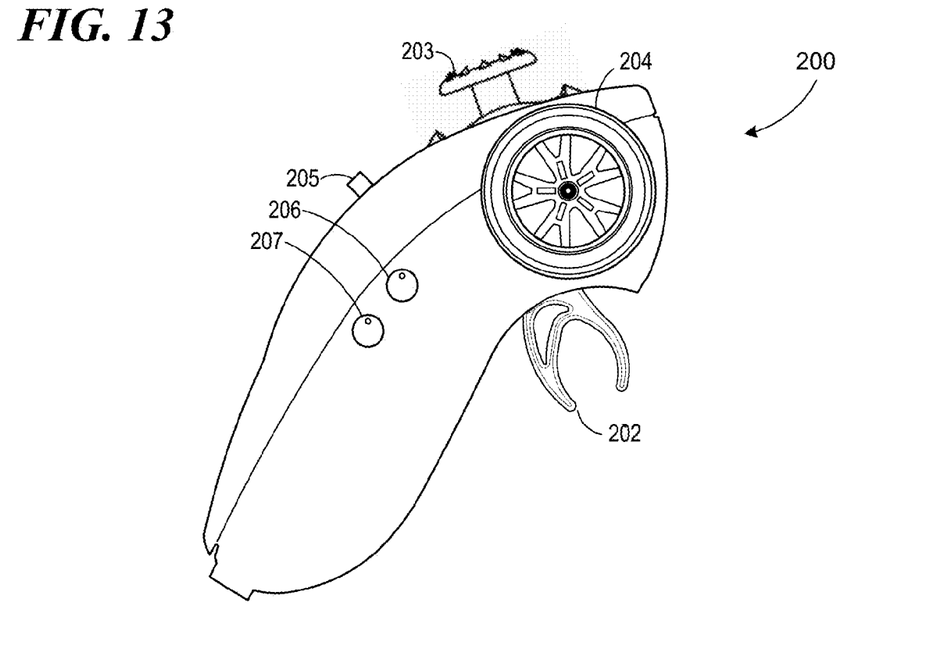

An alternate transmit controller 200 is shown in FIG. 13. Transmit controller 200 has throttle trigger 202 and steering knob 204, which may operate the same way as throttle trigger 102 and steering knob 104 in transmit controller 100. In an embodiment, the transmit controller 200 may also have a gimbal 203E, a "channel four" switch 205, a first auxiliary adjustment knob 106 and a second auxiliary adjustment knob 207, which may operate the same way as gimbal 103E, a "channel four" switch 105, and auxiliary adjustment knobs 106 and 107 in transmit controller 100. Operation of throttle trigger 202 may be the same as operation of throttle trigger 102 in transmit controller 100. When the vehicle is not being driven, throttle trigger 202 may be at a neutral position, as shown in FIG. 13. A driver may pull throttle trigger 202 from the neutral position toward the driver to command forward throttle. The driver may push throttle trigger 202 from the neutral position away from the driver to command reverse throttle or braking.

For an air vehicle to use a ground vehicle-like control model, two processes may be executed: an altitude control process and a steering control process. These processes may be added to a flight control process executed by a flight computer microprocessor on the aircraft. This flight control process may be performed by flight control software. The flight control process may receive the throttle, steering, and altitude commands transmitted by the pilot's transmit controller. The flight control process may also receive other commands transmitted by the pilot's transmit controller by other user interface inputs such as those shown in FIG. 1A.

Figures 5, 6, 7:
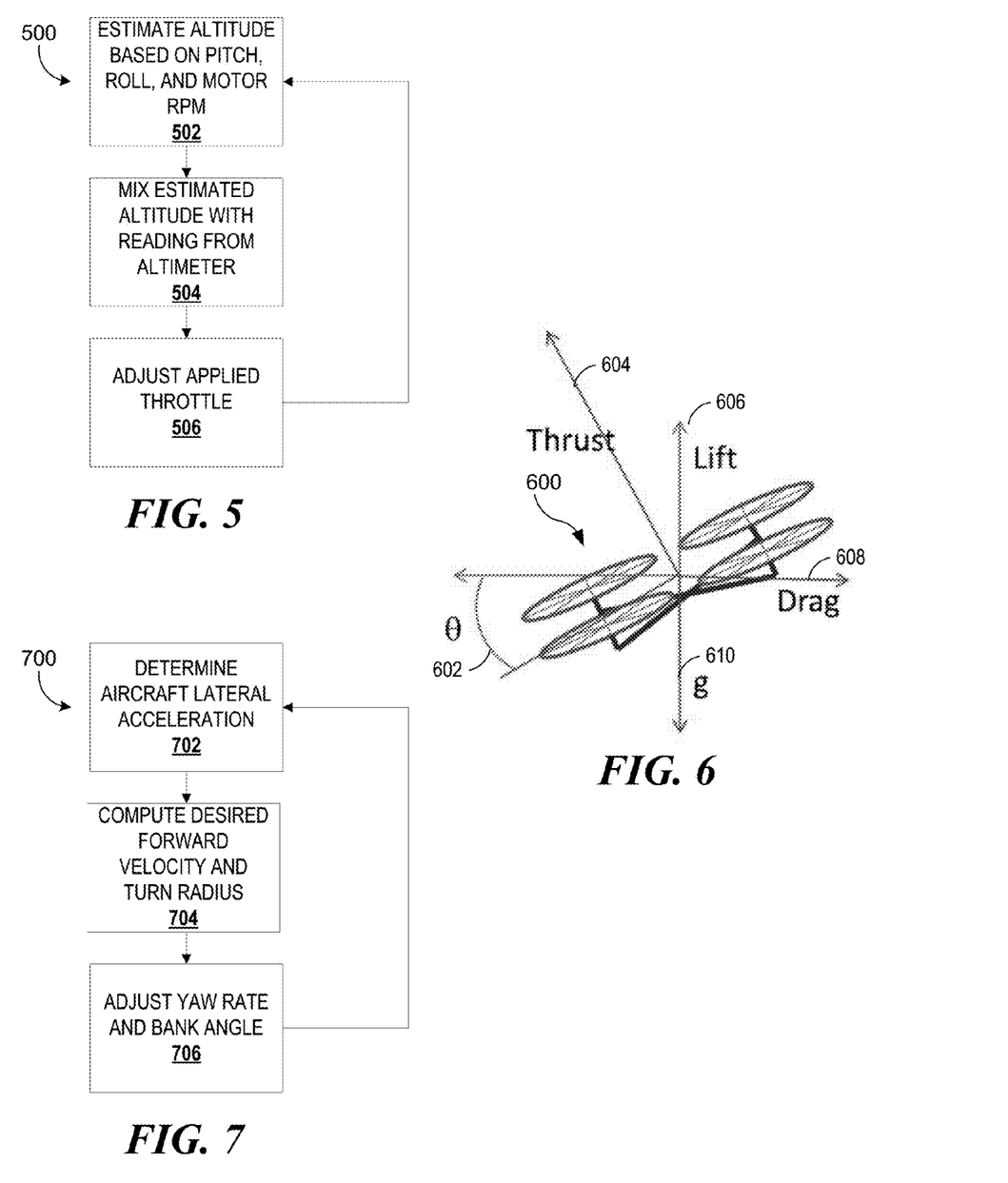
FIG. 5 shows an exemplary altitude control process.
FIG. 6 shows forces which may be taken into consideration when maintaining the altitude of an air vehicle executing a coordinated banked turn.
FIG. 7 shows an exemplary steering control process.

Referring to FIG. 5, depicted is an exemplary altitude control process 500. The purpose of altitude control process 500 is to control the altitude of the aircraft relative to a user-specified drive altitude. The drive altitude may be adjusted on the transmit controller with a gimbal, slider or thumb-wheel as described above. Once the drive altitude has been set, altitude control process 500 may maintain the drive altitude or dive and climb relative to the drive altitude. As described above, the rate of a dive or climb may be specified by the tilt of the transmit controller. Altitude control process 500 may limit the aircraft's altitude between the altitude floor and the altitude ceiling specified on the transmit controller. In one embodiment of a transmit controller, the altitude floor or altitude ceiling may be specified, or commanded, by user interface inputs 105, 106 or 107 as shown in FIG. 1A.

Altitude control process 500 may be a feedback control process. At 502, altitude control process may estimate a current aircraft altitude based on the aircraft's pitch and roll angles and motor RPM. At 504, altitude control process 500 may mix this estimated aircraft altitude with a reading from an aircraft altimeter. Said mixing can be performed using various "sensor fusion" techniques well understood by those skilled in the art. Examples of aircraft altimeters may include precision, high-resolution MEMS barometric pressure sensors, ultrasonic, laser, radar, or GPS. At 506, the resulting estimated altitude may be used to adjust the applied throttle to all motors. Altitude control process 500 may maintain the aircraft's altitude as the aircraft changes its pitch angle to accelerate forward.

Altitude control process 500 may also maintain the aircraft's altitude as the aircraft changes its pitch and roll angles to execute coordinated banked turns. Referring to FIG. 6, depicted is a quadcopter 600 executing a banked turn at angle 602. Forces which the altitude control process may take into consideration in maintaining the altitude of quadcopter 600 during the turn include thrust 604, lift 606, drag 608, and gravity 610. For example, when the aircraft banks by changing its roll angle from zero (horizontal) to angle 602, the vertical lift component 606 may decrease and the aircraft may lose altitude. In order to maintain the aircraft's altitude, the altitude control process 500 may command the motors to increase their RPM.

Referring to FIG. 7, depicted is an exemplary steering control process 700. The purpose of steering control process 700 is to convert the steering angle commanded by the transmit controller steering knob into an air vehicle maneuver. Steering control process 700 may be a control loop which uses an estimate of the vehicle's speed and the commanded steering angle to calculate the aircraft pitch, yaw, and roll angular rates and angles.

Using the pilot's input from the steering knob, steering control process 700 may adjust the roll and yaw of the air vehicle to match the dynamics of a ground vehicle. For example, a user may indicate a steering angle by turning the steering knob. Steering control process 700 may estimate the air vehicle's current forward velocity and use the steering angle and forward velocity to set the air vehicle's roll angle and yaw rate. Estimates of the multi-rotor air vehicle's (quadcopter, for example) current forward velocity may be obtained using the vehicle's pitch. In one method, the velocity estimate of steering control process 700 may be linear and directly proportional to the pitch angle of the air vehicle. In another method, steering control process 700 may take into account time when estimating the velocity. For example, the time to accelerate the vehicle from a starting velocity, V1, to a greater velocity, V2, will be non-zero. Understanding this non-zero time and accounting for it in steering control process 700 will provide a more accurate and realistic estimate of the vehicle's velocity. Alternatively the forward velocity estimate may be obtained by direct measurement using sensing technologies such as GPS, for example.

At 702, steering control process 700 may determine the lateral acceleration of the aircraft using the attitude (pitch, roll, and yaw) of the aircraft and a dynamic model of the aircraft. For example, if the aircraft is a quadcopter held at a fixed altitude, the thrust up counteracts the weight of the aircraft. Steering control process 700 may use this thrust and the aircraft's pitch and roll angles to estimate the aircraft's lateral acceleration. For a quadcopter which is diving or climbing, steering control process 700 may adjust its estimate of the thrust vector in consideration of the climb or dive rate.

At 704, steering control process 700 may apply the user's steering and throttle inputs and the model of the car to compute the user's desired forward velocity and turn radius. At 706, steering control process 700 may use the target turn radius and the aircraft's speed and attitude to adjust the aircraft's yaw rate and bank angle.

For different aircraft types, one skilled in the art may bring known control methods to bear with both the altitude and steering control processes as appropriate. For example, with a fixed-wing aircraft, the steering control process might control the bank angle with a Proportional-Integral-Derivative (PID) Controller that maintains the "down vector" pointing through the bottom of the aircraft. For other aircraft types, such as quadcopters, the resulting centrifugal force might be estimated at 704 and used to determine the bank angle that maintains the "down vector" pointing through the bottom of the aircraft.

As another example, a quadcopter or other multi-rotor helicopter may have a mixing step in the flight control process. The altitude control process may determine an average power for all of the motors. The steering control process may determine the average power of the motors in relation to one another. A mixing step may linearly mix the results of these two processes to produce the average power for each motor.

For example, if the quadcopter were banking right, the steering control process may specify the left motors should have higher average power than the right motors. The mixing step may combine this result with the average power determined by the altitude control process to determine the average power each motor should operate at.

While the air vehicle control model described is comparable to the control model of a ground vehicle, it is not necessarily identical. For example, releasing controls on a land-based vehicle may cause the vehicle to roll to a stop and wait for the next user control input. For air-based vehicles, wind and other air currents may constantly prevent the vehicle from maintaining a single position.

In one embodiment, a steering control process may be used without an altitude control process. Altitude may be controlled conventionally, such as through throttle and collective pitch for quadcopters and helicopters, or through pitch and throttle for airplanes. The steering control process may control the yaw rate and roll angle for turns as described above.

In an aircraft: the controller in the aircraft may adjust throttle and/or pitch to keep the aircraft at a substantially constant altitude when an altitude change command signal is not received from the hand-held transmit controller. A third switch (e.g., a slide) on the hand-held transmit controller may be used to adjust altitude separately from the trigger. Further, the aircraft controller may add throttle in some relationship to pitch angle command, regardless of the altitude switch setting. Using mixing or some additive algorithm, the throttle may be increased or decreased from the setting determined by the trigger pitch control, using the third switch may be used to separately control altitude.

In certain embodiments, at least one of the HMI inputs may be used to vary two or more control outputs. An example is commanding turning of an aircraft with a single HMI input (e.g., stick movement, steering wheel turn, and the like), and corresponding bank, rudder (fixed-wing aircraft) and/or yaw rate (rotor aircraft) output commands being transmitted. Another example is commanding pitching of an aircraft with a single HMI input, and corresponding elevator (fixed-wing aircraft), pitch (rotor aircraft), and/or throttle output commands being transmitted.

In an aircraft, note that varying the position of the knob of the first HMI input may vary one or more radio signals transmitted by the radio transmitter for control of bank angle of an aircraft in a turn: (1) the yaw rate may be set with reference to the bank angle determined in response to control signals received by the aircraft receiver/controller (e.g., fixed linear ratio, fixed exponential ratio, or fixed to specific bank angles, etc.); (2) the yaw rate may be set with reference to the turn radius (tighter or more open turns) determined in response to turn control signals received by the aircraft receiver/controller; (3) the yaw rate may be set with reference to the turn radius determined in response to control signals received by the aircraft receiver/controller and with reference to the speed of the aircraft (either determined using accelerometers, estimated by pitch angle signals, etc.; (4) any other prior art techniques that are available or known, such as possibly adjusting yaw until accelerometer readings show the resulting force vector no longer having a lateral component, may be used.

In an aircraft: the radius of a turn may be controlled by setting bank angle for any given/constant (i) speed, (ii) pitch and/or (iii) throttle setting, or using any other available/known prior art technique.

In an embodiment, a method for controlling a remote control aircraft offering ground vehicle-like control, may comprise: receiving steering angle control input from a transmitter controller; a state estimation process estimating the attitude, acceleration, and velocity of the aircraft; a steering control process including: a model of a car including wheel base; and a mapping of the car model, the velocity and the steering angle to a desired yaw rate and bank angle; and the method further comprising a flight control process that controls the aircraft to the yaw rate and bank angle commanded by the steering control process. In an embodiment, the method may further comprise providing a throttle input to control forward/reverse velocity or braking. In an embodiment, the method may further comprise providing an altitude control.

It will be understood that a variety of control "mixes" are available on "computer" radios to avoid or compensate for other "undesirable" flight characteristics. An example is a mix of bank angle and pitch (or throttle). If the aircraft loses altitude due to loss in vertical lift when banking, the transmitter may be programmed to add up pitch or some throttle to help maintain altitude. Other control mixes, such as but not limited to previously discussed techniques implementing control mixing and various combinations of controls that are mixed, may be employed in transmit controller 100.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

Various methods, aircraft, and controllers consistent with the preceding disclosure comprise the following:

Method 1: A method for a remote control aircraft offering ground vehicle-like control, the method comprising:
  performing an altitude control process, the altitude control process comprising:
    estimating an altitude of the aircraft;
    receiving an altitude instruction from a transmit controller; and
    determining an altitude aircraft action to respond to the altitude instruction;
  performing a steering control process, the steering control process comprising:
    receiving a steering instruction specified by a pilot, the steering instruction comprising a steering angle; and
    determining a steering aircraft action to respond to the steering angle; and
  operating the aircraft in accordance with the altitude aircraft action and the steering aircraft action.

Method 2: Method 1, wherein estimating the altitude of the aircraft comprises:
  estimating a preliminary altitude based on at least a pitch angle of the aircraft, a roll angle of the aircraft, and an aircraft motor RPM; and
  mixing the preliminary altitude with a reading from an altimeter of the aircraft.

Method 3: Method 1, wherein the altitude instruction comprises one of an instruction to maintain altitude, an instruction to climb at a specified rate, and an instruction to dive at a specified rate.

Method 4: Method 1, wherein the steering aircraft action comprises setting a roll rate and setting a yaw rate.

Method 5: Method 1, wherein the aircraft is a fixed-wing aircraft.

Method 6: Method 1, wherein the aircraft is a helicopter.

Method 7: Method 1, wherein the aircraft is a multi-rotor helicopter comprising four rotors and four motors, with each rotor controlled by a motor.

Method 8: Method 7, wherein the altitude aircraft action comprises an average power applied to all of the motors and the steering aircraft action comprises an average power applied to each motor relative to the other motors.

Method 9: Method 8, further comprising linearly mixing the altitude aircraft action and the steering aircraft action to produce an average power applied to each motor.

Method 10: Method 9, wherein the operating the aircraft comprises applying to each motor the average power produced by the linear mixing.

Method 11: A method for a remote control aircraft offering ground vehicle-like control, the method comprising:
  performing a steering control process, the steering control process comprising:
    receiving a steering instruction specified by a pilot, the steering instruction comprising a steering angle; and
    determining a steering aircraft action to respond to the steering angle; and
  operating the aircraft in accordance with the steering aircraft action.

Method 12: Method 11, wherein the steering aircraft action comprises setting a roll rate and setting a yaw rate.

Method 13: Method 11, wherein the aircraft is a fixed-wing aircraft.

Method 14: Method 11, wherein the aircraft is a helicopter.

Method 15: Method 11, wherein the aircraft is a multi-rotor helicopter comprising four rotors and four motors, with each rotor controlled by a motor.

Aircraft 1: A remote control aircraft offering ground vehicle-like control, the aircraft comprising a flight control microprocessor configured to:
  perform an altitude control process, the altitude control process comprising:
    estimating an altitude of the aircraft;
    receiving an altitude instruction from a transmit controller; and
    determining an altitude aircraft action to respond to the altitude instruction;
  perform a steering control process, the steering control process comprising:
    receiving a steering instruction specified by a pilot, the steering instruction comprising a steering angle; and
    determining a steering aircraft action to respond to the steering angle; and
  operate the aircraft in accordance with the altitude aircraft action and the steering aircraft action.

Aircraft 2: Aircraft 1, wherein the estimating the altitude of the aircraft comprises:
  estimating a preliminary altitude based on at least a pitch angle of the aircraft, a roll angle of the aircraft, and an aircraft motor RPM; and
  mixing the preliminary altitude with a reading from an altimeter of the aircraft.

Aircraft 3: Aircraft 1, wherein the altitude instruction comprises one of an instruction to maintain altitude, an instruction to climb at a specified rate, and an instruction to dive at a specified rate.

Aircraft 4: Aircraft 1, wherein the steering aircraft action comprises setting a roll rate and setting a yaw rate.

Aircraft 5: Aircraft 1, wherein the aircraft is a fixed-wing aircraft.

Aircraft 6: Aircraft 1, wherein the aircraft is a helicopter.

Aircraft 7: Aircraft 1, wherein the aircraft is a multi-rotor helicopter comprising four rotors and four motors, with each rotor controlled by a motor.

Aircraft 8: Aircraft 7, wherein the altitude aircraft action comprises an average power applied to all of the motors and the steering aircraft action comprises an average power applied to each motor relative to the other motors.

Aircraft 9: Aircraft 8, wherein the flight control microprocessor is further configured to linearly mix the altitude aircraft action and the steering aircraft action to produce an average power to be applied to each motor.

Aircraft 10: Aircraft 9, wherein the flight control microprocessor being configured to operate the aircraft comprises the flight control microprocessor being configured to apply to each motor the average power produced by the linear mixing.

Aircraft 11: A remote control aircraft offering ground vehicle-like control, the aircraft comprising a flight control microprocessor configured to:
  perform a steering control process, the steering control process comprising:
    receiving a steering instruction specified by a pilot, the steering instruction comprising a steering angle; and
    determining a steering aircraft action to respond to the steering angle; and operate the aircraft in accordance with the steering aircraft action.

Aircraft 12: Aircraft 11, wherein the steering aircraft action comprises setting a roll rate and setting a yaw rate.

Aircraft 13: Aircraft 11, wherein the aircraft is a fixed-wing aircraft.

Aircraft 14: Aircraft 11, wherein the aircraft is a helicopter.

Aircraft 15: Aircraft 11, wherein the aircraft is a multi-rotor helicopter comprising four rotors and four motors, with each rotor controlled by a motor.

Controller 1: A transmit controller offering ground vehicle-like control for a remote control aircraft, the transmit controller comprising:
- a steering control;
- a throttle/brake control; and
- an altitude control.

Controller 2: Controller 1, wherein the steering control comprises a steering knob.

Controller 3: Controller 1, wherein the throttle/brake control comprises a throttle trigger.

Controller 4: Controller 1, wherein the altitude control comprises a gimbal.

Controller 5: Controller 1, wherein the altitude control comprises a tilt sensor.

Controller 6: A transmit controller offering ground vehicle-like control for a remote control aircraft, the transmit controller comprising:
- a steering control; and
- a throttle/brake control.

Controller 7: Controller 6, wherein the steering control comprises a steering knob.

Controller 8: Controller 6, wherein the throttle/brake control comprises a throttle trigger.

We claim:

1. A method for a remote control aircraft offering ground vehicle-like control, the method comprising:
   - receiving at least one steering angle control input from a transmitter controller;
   - an electronic state estimation process comprising estimating an attitude, an acceleration, and a velocity of the aircraft;
   - an electronic steering control process comprising:
     - mapping a model of a car, the model of a car including a wheel base, comprising mapping the at least one steering angle control input to steering of the model of a car; and
     - utilizing the mapping of the model of a car, the aircraft velocity estimate, and the at least one steering angle control input to command at least an aircraft yaw rate and an aircraft bank angle; and
   - an electronic flight control process comprising controlling the aircraft to the aircraft yaw rate and the aircraft bank angle commanded by the steering control process.

2. The method of claim 1, further comprising providing a throttle input to control a directional velocity or braking of the aircraft.

3. The method of claim 2, wherein the electronic flight control process further comprises controlling an altitude of the aircraft.

4. The method of claim 1, wherein the step of mapping further comprises mapping the at least one steering angle control input to match a plurality of steering angles of the model of a car.

5. The method of claim 1, wherein the step of mapping further comprises mapping the at least one steering angle control input to match one or more turning characteristics of the model of a car.

6. The method of claim 1, wherein the step of mapping further comprises mapping the at least one steering angle control input to match a plurality of turn radii of the model of a car.

7. The method of claim 1, wherein the electronic steering control process further comprises steering of the aircraft to match the steering angle of the model of a car that would result from the at least one steering angle control input.

8. The method of claim 1, wherein the electronic steering control process further comprises steering of the aircraft to match the turning radius of the model of a car that would result from steering the model of a car using the at least one steering angle control input.

9. The method of claim 1, wherein the electronic steering control process further comprises steering of the aircraft to match one or more steering characteristics of the model of a car that would result from the at least one steering angle control input.

10. The method of claim 1, wherein the electronic steering control process further comprises the commanded aircraft yaw rate and the commanded aircraft bank angle causing a course flown by the aircraft to match a turn of the model of a car that would result from substantially the same steering angle control input.

11. The method of claim 1, wherein the electronic steering control process further comprises the commanded aircraft yaw rate and commanded aircraft bank angle causing the aircraft to turn with a radius matching a turn radius of the model of a car that would result from substantially the same the steering angle control input.

12. The method of claim 1, wherein the electronic steering control process further comprises the commanded aircraft yaw rate and commanded aircraft bank angle causing a course flown by the aircraft to match a turn of the model of a car that would result from a steering angle commanded by substantially the same steering angle control input.

* * * * *